PHONOGRAPH APPARATUS

Filed Oct. 31, 1955 2 Sheets-Sheet 1

INVENTOR.
John D. Bick
BY
Morris L. Rabkin
ATTORNEY.

INVENTOR.
John D. Bick
BY Morris A. Rabkin
ATTORNEY.

2,921,992

PHONOGRAPH APPARATUS

John D. Bick, Moorestown, N.J., assignor to Radio Corporation of America, a corporation of Delaware Application October 31, 1955, Serial No. 543,900

The terminal fifteen years of the term of the patent to be granted has been disclaimed 18 Claims. (Cl. 179—100.4)

The present invention relates to phonograph apparatus, and more particularly to an automatic control system for phonograph apparatus that operates to prevent repeated tracking by the phonograph pickup of the same groove on a record.

Disc records are commonly used with automatic record changing machines which play a large number of records successively. A defect in any one record, which may cause repetitive reproduction of the same groove, is very annoying to the listener. Known automatic record changing mechanisms do not operate until the end of a record. Therefore, in the event of a repeated groove, a manual adjustment must be made in order to permit the usual record changing cycle. This may cause a great deal of inconvenience to the listener.

Disc records form a large part of the daily radio broadcasting program schedule. It is desirable to play a large number of records, one after the other without the need for a "disc-jockey" attendant. Unattended broadcast studios where automatic machinery plays an entire day's program of recorded music is an ultimate objective. Repeated tracking of the same groove on any record in any unattended record reproduction system may produce disasterous consequences. The same groove will play over and over again, for an unlimited time, unless some means are provided to rectify the condition.

In accordance with the invention, an automatic control system is provided which prevents the repeated tracking of the same groove on a grooved record, such as the conventional disc record. There is provided a separate control channel which receives the signal from the phonograph pickup. This signal is delayed for a specified time equal to the time required for the same groove on the record to repeat. One means for effecting this delay is to magnetically record the signal on a recording medium, such as magnetic tape. The delayed signal is reproduced after the specified time interval which will be equal to the period of one revolution of the record in most instances. Therefore, two signals are available. These signals would correspond to the sound recorded in consecutive grooves on the disc record during normal record reproduction. The delayed signal is compared with the signal entering the control channel. If the signals are identical for a given period, it will reveal that the same groove has repeated, and an error signal may be supplied to actuate suitable mechanism for counteracting the condition. This may be done by advancing the pickup arm, for example.

In one form of the invention, a pair of magnetic reproducing devices are used with a looped magnetic recording medium that is rotated at a constant velocity. These reproducing devices are spaced along the loop so that the simultaneous reproduction of signals from consecutive grooves on the record will result. Means may be provided to erase signals recorded on the magnetic recording medium after reproduction by both reproducing devices. The signal output from each of the magnetic reproducing devices may be transmitted through envelope detectors to provide two signal outputs that are proportional to the envelopes of the recorded signal. These two signal outputs may be compared to determine if the magnetically reproduced signals are identical over a given time period that is indicative of a repetition of the same groove on the disc record. If it is determined that the same groove has been repeated, the phonograph pickup may be automatically advanced or an alarm signal sounded.

It is an object of the present invention to provide a novel system for improving the operation of automatic phonograph apparatus.

It is a further object of the present invention to provide a novel system for automatically controlling phonograph apparatus to eliminate the possibility of successively reproducing the same portion of a recorded signal.

It is a still further object of the present invention to provide a novel system for the elimination of repeated tracking of the same groove during record reproduction that is responsive to the output signal from the pickup device in phonograph apparatus.

It is a still further object of the present invention to provide a novel system for automatically detecting repeated grooves during disc record reproduction.

Other objects and advantages of the present invention will, of course, become apparent and immediately suggest themselves to those skilled in the art to which the invention is directed from a reading of the following description in connection with the accompanying drawing in which.

Figure 1:
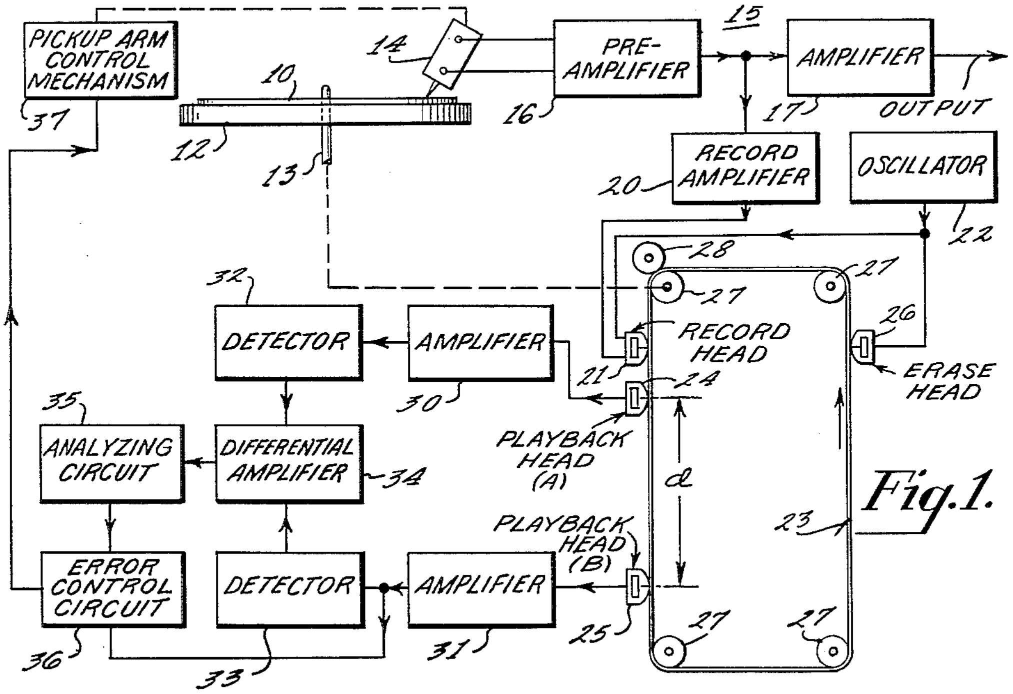
Figure 1 is a diagram, schematically showing an automatic control system provided by the present invention for preventing repetitive tracking of the same groove during disc record reproduction.

In Figure 1, a record 10 is schematically represented as being disposed upon a turntable 12. A shaft 13 drives the turntable. This shaft may be connected to a suitable motor (not shown).

The record 10 is a disc record of the conventional type. Signals are recorded in concentric, consecutive, spiral grooves on the record. A pickup 14 engages and tracks the grooves. The needle on the pickup rides in the grooves. The pickup 14 may be of any conventional design and functions as a transducer to reproduce the signals recorded in the grooves into corresponding electrical output signals.

The pickup 14 is electrically connected to a signal output channel 15. This channel includes a pre-amplifier 16 that is connected to the output terminals of the pickup 14, and an output amplifier 17 that is connected to the output of the pre-amplifier 16. The output of the amplifier 17 may be used to operate a loudspeaker or may be connected into the signal input apparatus of a radio broadcast transmitter.

The present invention is directed toward counteracting the possibility that the same groove on the record may repeat. To this end, a system for moving and advancing the pickup 14 in response to the occurrence of a repeated groove is provided. The signal channel 15 is ordinarily found in record reproduction apparatus. A signal is derived from this signal channel; at a point between the pre-amplifier 16 and the amplifier 17, for example. This signal is applied to the novel system provided by the present invention.

A record amplifier 20 has applied thereto the diverted signal from the signal output channel 15. This record amplifier 20 is connected, to a magnetic recording head 21. An oscillator 22 is also connected to the record head 21. The record amplifier 20 and the oscillator 22 cooperate in the well known manner to record the diverted signal from the signal output channel 15 upon a loop 23 of magnetic tape.

It is desirable that a loop of magnetic tape is used in the present application. However, any endless recording medium, or a recording medium of sufficient length may be a suitable alternative.

It is further desirable that the tape loop 23 is rotated at a constant velocity and synchronism with the turntable 12. To this end one of the rollers 27 which guides the tape loop 23 functions as a drive capstan and is associated with a pressure roller 28. The capstan roller is mechanically coupled for rotation with the shaft 13 of the turntable 12 as indicated by the dashed line.

Two reproducing or playback heads 24 and 25 are magnetically coupled to the tape loop 23. The first of these playback heads 24 is designated as playback head (A). The second of these playback heads 25 is designated as playback head (B). The playback heads 24 and 25 are separated by a given distance, *d*, along the length of the tape loop 23. Because of the separation of the heads 24 and 25 by the given distance, *d*, the signal reproduced by playback head (B) is delayed from the signal reproduced by the playback head (A). The delay between these signals ordinarily will correspond to the period of one revolution of the turntable 13. Therefore, the signal output from playback head (A) would correspond to the signal reproduced by the pickup 14 from one groove on the record 10 and the output signal by playback head (B) will correspond to the signal reproduced by the pickup 14 at the next, consecutive groove. The recording medium 23 functions as an accurate and sensitive signal delay device.

An erase head 26 connected to the oscillator 23 is magnetically coupled to the tape loop 23. This erase head 26 is located at a point on the tape loop after the playback head (B) and before the record head 21 as viewed in the direction of motion of the loop 23. The erase head 26 operates in the well known manner to cancel information signals recorded on the tape after these signals have been played back by the playback heads 24 and 25, and before new signals are recorded on the tape by the record head 21.

It has been seen that the portion of the system provided by the present invention which is described above simultaneously provides two signals from consecutive grooves on the disc record 10. The remaining portion of the system provided by this invention compares these signals in order to determine whether a repeated groove condition exists.

An amplifier 30 is connected to receive output signals from the playback head (A) 24. Another amplifier 31 is similarly connected to the playback head (B) 25. Detectors 32 and 33 are connected to the amplifiers 30 and 31 respectively. These detectors 32 and 33 provide an output signal which varies more slowly than the signals directly reproduced by the playback heads 24 and 25. These detectors 32 and 33 are in the nature of envelope detectors similar to those used in radio receivers. It is preferable, but not every instance necessary, to use such detectors. However, as a practical matter, they are useful to prevent imperfections in the recording medium, such as minute gaps in the medium which cause collapsing fields and drop outs, from adversely effecting the system.

The output of the detectors 32 and 33 is connected to a comparing circuit which may be a differential amplifier 35. The illustrative differential amplifier 34 is designed to provide an absence of output signal when the signals applied to it from the detectors 32 and 33 are identical. The output of the differential amplifier 34 is applied to an analyzing circuit 35. This circuit 35 functions to prevent very short periods of identical signal output from the playback heads (A) and (B) from being identified as a repeated groove condition. The analyzing circuit 35, therefore, insures only a repeated groove condition will produce an output signal. Consequently, the output signal from the analyzing circuit 35 may be used to indicate a repeated groove.

It may be seen, therefore, from the above discussion that an identical signal reproduced by both playback heads (A) and (B) is indicative of a repeated groove condition. There is the remote contingency that in some pieces of music or speech recorded on a record, there may be two or more silent grooves in which no signals are recorded. To this end, an error control circuit 36 is provided. The output of the error control circuit is an electrical signal that is applied to a mechanism 37 for controlling the pickup arm 14. The error control circuit functions to prevent the actuation of the pickup arm control mechanism 37 in the event of consecutive silent grooves. An input signal for the error control circuit is derived from one of the amplifiers 30 or 31. This input is shown as being derived from the amplifier 31 in the drawing. The error control circuit may in effect operate as a safety switch to prevent an output signal from the discriminator circuit 35 from being applied to the pickup arm control mechanism 37 during consecutive silent grooves.

The pickup arm control mechanism 37 may be mechanically connected to the pickup 14 so that it may apply a force to the pickup 14 and advance it across the record 10. In its simplest form, the pickup arm control mechanism may be a solenoid. For example, the solenoid may be disposed to actuate the reject mechanism of an automatic record changer so that a record having repeating grooves will be automatically rejected.

Figure 2:
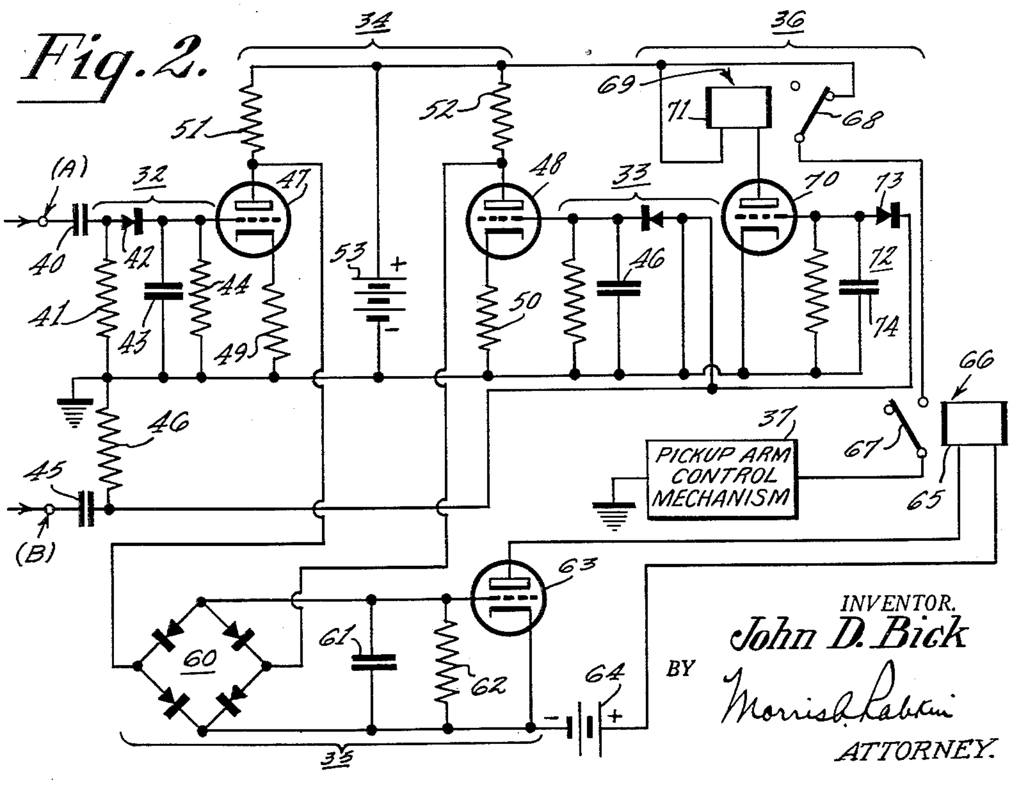
Figure 2 is a schematic diagram showing parts of the system illustrated in Figure 1 in greater detail.

A more detailed diagram of circuits suitable for the detectors 32 and 33, the differential amplifier 34, the discriminator circuit 35 and the error control circuit 36 are shown in Figure 2. The operation of the circuits shown in Figure 2 will be best understood in connection with the waveforms represented in Figure 3. The input terminals marked (A) and (B) correspond to the output of the amplifier 30 connected to playback head (A) and the output of the amplifier 31 connected to the playback head (B) respectively. Output (A) is connected to the detector network 32 through a capacitor 40. The detector network 32 may be a well known type of envelope detector that produces a positively polarized output signal. It is shown as consisting of a shunt resistor 41, a series diode 42, and a shunt capacitor 43 that is connected between the output of the diode 42 and ground. A shunt resistor 44 connected across the capacitor 43 also forms the grid resistor of the tube in the differential amplifier. The other input signals which originate at the playback head (B) are applied through a capacitor 45 to an envelope detector 33 substantially identical to the envelope detector 32 described above. A shunt resistor 46 is connected from one end of the capacitor 45 to ground.

Figure 3:
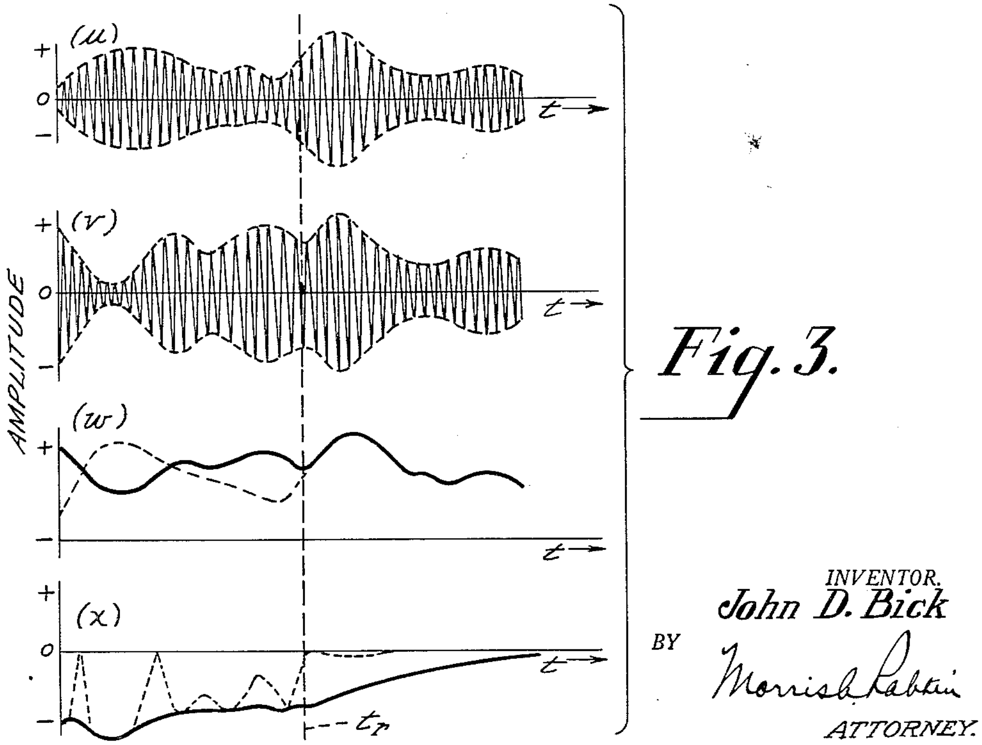
Figure 3 shows representations of several signal waveforms, the waveforms occurring in operation of the system illustrated in Figures 1 and 2.

The input signal applied to the envelope detector 32 at input (A) is represented by waveform ($u$) of Figure 3, and the input signal applied to the other envelope detector 33 at input (B) is represented by waveform ($v$) of Figure 3. It may be noted that these waveforms are typical of music or speech; being composed of waves which vary both in frequency and of amplitude. However, it may further be observed that before a time designated as $t_r$ that both waveforms are different and that after the time, designated as $t_r$ that both waveforms are identical. This follows from the fact that the signals represented by waveform ($u$) are different from the signals represented by waveform ($v$) because they are reproduced at consecutive grooves. At $t_r$ it is assumed that a repetition of the same groove has occurred. The pickup 14 may have jumped. Therefore, the waves depicted are substantially identical.

It has been found that correspondence of the output signals such as illustrated by waveforms (*u*) and (*v*) can be more easily established if these waves are detected by means of envelope detectors 32 and 33, such as those illustrated in the drawing.

In waveform (*w*), the output of the envelope detectors 32 and 33 may be observed and compared. The wave shown by the solid line may illustrate the output of the envelope detector 32. This wave would then appear across the capacitor 43. The wave designated by the dashed line then illustrates the output of the other envelope detector 33, and would appear across the shunt capacitor 46 contained therein. After time $t_r$, the output of both envelope detectors are substantially identical so that only one wave is represented.

A differential amplifier 33 may be used to compare the output signals from the envelope detectors 32 and 33. This differential amplifier may include two tubes 47 and 48 which have resistors 49 and 50 of equal value in the cathode circuits thereof and resistors 51 and 52 in the plate circuit thereof which also are of equal value. Of course, other resistors and components (not shown for purposes of simplicity of illustration) may be used to compensate for variations due to aging of the tubes 47 and 48 and due to stray impedances. A source of operating voltage, illustrated herein as being a battery 53, has its positive terminal connected to the resistors 51 and 52 and its negative terminal connected to ground. The operation of differential amplifiers of this type is well known and it will be appreciated that identical signals applied to the grids of the tubes 47 and 48 will produce no output signal between the plates of the tubes. However, should the signals applied to the grids of one of the tubes be higher or lower in magnitude than the signals applied to the grid of the other tube, an output signal will appear between the plates of the tubes 47 and 48. Consequently, the plates of the tubes 47 and 48 in the differential amplifier 33 are connected to the analyzing circuit 35.

The analyzing circuit 35 includes an arrangement of diodes in the form of a bridge 60. The plates of the tubes 47 and 48 are connected at opposite corners of the bridge 60. The remaining corners of the bridge 60 are connected to opposite ends of a capacitor 61. A shunt resistor 62 is connected across the capacitor 61. This resistor 62 forms the grid resistance of a tube 63. The capacitor 61 and the resistor 62 form a resistance-capacitance network having a predetermined discharge time constant. But, the bridge circuit 60, the capacitor 61, and the resistor 62 form a circuit having a very much shorter charging time constant.

It may be observed that the diodes in the bridge 60 arrangement are polarized such that a negative voltage will develop at the terminal of the capacitor 61 that is connected to the grid of the tube 63. Consequently, as long as unequal signals are applied to the differential amplifier 33 and an output therefrom results, a negative signal will be developed across the capacitor 61. This signal is impressed upon the grid of the tube 63.

Looking now to waveform (*x*) of Figure 3, the solid line represents the voltage waveform established across the capacitor 61 as a result of the variation in input signal applied to the differential amplifier 33. The dashed lines, some of which are obscured by the solid line, represent the output of the differential amplifier 33 which appears between the plates of the tubes 47 and 48. It is to be noted that there are short intervals of no output signal due to brief periods when the envelopes of the input signals applied to the differential amplifier 33 are identical. In order to discriminate such intervals from more prolonged intervals of identical signal which occur when a groove repeats, the resistance capacitance circuit 61, 62 having a short charging time constant, but a long discharging time constant is provided. It is to be noted that the capacitor maintains its charge over the short periods of identical envelope amplitude. However, the capacitor 61 has enough time to discharge through its associated resistor 62 for the prolonged periods during which no output signal is impressed across the bridge arrangement 60 by the differential amplifier. Therefore, the negative bias impressed upon the grid of the tube that is connected to the capacitor 61 is reduced sufficiently to allow the tube 63 to conduct.

A source of voltage indicated illustratively as a battery 64 is connected, at its negative terminal, to the cathode 63. The positive of the battery 64 is connected, through the operating winding 65 of a relay 66, to the plate of the tube 63. Consequently, when the tube 63 conducts, the relay 66 is operated and the contacts 67 thereof close. The pickup arm control mechanism 37 is connected to the movable one of the contacts 67. Since one side of the pickup arm control mechanism is grounded, a circuit is completed through the contacts 67 and pickup arm control mechanism to ground. The fixed contact of the relay 66 is connected through a normally closed pair of contacts 68 of another relay 69. These contacts 68 are connected, in turn, to the positive terminal of the battery 53 which supplied operating power for the differential amplifier 33. Consequently, when the contacts 67 of the relay 66 close, a complete circuit is provided from the battery 53 through the pickup arm control mechanism 37. The operation of the pickup arm control mechanism is thereby effected.

The relay 69 and the contacts thereof 68 function as a safety switch in the event that consecutive silent grooves occur which may erroneously cause the operation of the pickup arm control mechanism 37. This relay 69 is an element in the error control circuit 36 referred to in Figure 1. The error control circuit 36 includes a tube 70. The cathode of this tube 70 is grounded, and the anode is connected through the operating winding 71 of relay 69 to the positive terminal of the battery 53. The grid of the tube 70 is connected to the input (B) by way of an envelope detector network 72 which is similar to the envelope detectors 32 and 33 heretofore described. However, the difference between this envelope detector 72 and the other envelope detectors 32 and 33 that is that the diode 73 therein is oppositely polarized; that is, the anode of the diode 73 is connected to the grid of the tube 70. Therefore, a negative voltage will be developed across the capacitor 74 when a signal is applied to the envelope detector 72. The tube 70 will be nonconductive so long as an input signal is applied at input (B). This will occur when the playback head (B) picks up a signal from a tape loop 23. In the event that a silent groove occurs, there will be an absence of signal applied to the envelope detector 72. The tube 70 and the circuit thereof is designed in accordance with well known engineering principals so that tube 70 will be conductive when the negative bias applied to the grid thereof is removed. Since the negative bias is removed on the occurrence of a silent groove, the relay 69 will be operated. This will cause the opening of the contact 68 of the relay 69. The circuit from the battery 53 to the pickup arm control mechanism 37 will, therefore, be open and the operation of the pickup arm control mechanism will be prevented.

Figure 4:
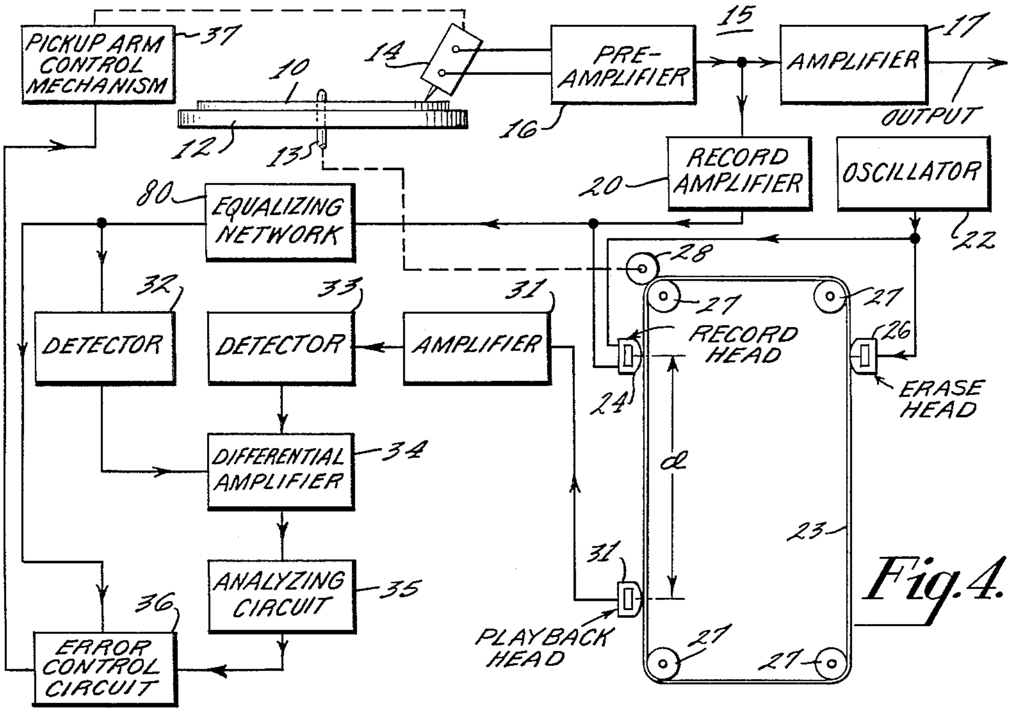
Figure 4 is a diagram, schematically showing a modified form of the system provided by the present invention.

Figure 4 illustrates a modified form of the present invention which is similar in some respects to the system described in connection with Figures 1, 2 and 3. Consequently, like reference numerals are used in Figure 4 to designate like parts shown in the other figures. A loop 23 of magnetic tape is used. The reproduced signal is diverted from the signal output channel 15, amplified, and applied to a record head 24 as in the above described system provided by the present invention. A single playback head 81 is positioned at a point separated from the record head by the given distance, *d*.

This distance is the same as the distance, *d*, shown in Figure 1. That is, the signal reproduced by the playback head 81 will be delayed from the signal applied to the record head by an interval equal to the period of one revolution of the record. An output signal from the record amplifier 20 is applied to an equalizing network 80. Two signals corresponding to the signal reproduced from the pickup 14 from two consecutive grooves are, therefore, simultaneously available. The signal from the leading groove is available at the output of the record amplifier 20 and the signal from the groove immediately behind that leading groove is available at the output of the playback head 81.

The output of the playback head 87 is applied to an amplifier 31. The amplifier 31 is connected to a detector 33 which may be an envelope detector. The output of the detector is connected to a differential amplifier 34 for comparing the two simultaneous signals for identity.

The equalizing network 80 is connected to a detector 32 which may be an envelope detector. The output of the envelope detector is then applied to the differential amplifier 34. The equalizing network 80 is provided in order to equalize the phase and amplitude characteristics of the signal received from the record amplifier output. This equalization is desirable since the use of a magnetic tape recording medium and an amplifier 31 may change the characteristics of the record amplifier output signal. Output of the record amplifier 20, the output of the equalizing network 80 is also applied to an error control network 36. The detectors 32 and 33, the analyzing circuit 35 and the error control circuit 36 may be identical witht those described in connection with Figures 1 to 3. It may be observed, however, one input to the control circuit may be obtained from the equalizing network instead of from a playback head. This modified form of the present invention may be observed to utilize fewer components than the system illustrated in connection with Figure 1.

There has, therefore, been described a new and improved system for preventing repeated grooves on records. The records illustrated have been of the disc type. However, the system may be used in connection with other types of records having consecutive grooves or tracks.

I claim:

1. In a sound phonograph apparatus for playing grooved records having a pickup device for reproducing signals recorded on said record, a system for the detection of repeatedly reproduced signals recorded in a single groove comprising electrical means responsive to the signal output of said pickup device for providing an error signal upon repetition of signals recorded in any one of said grooves, means for delaying said signals from said pickup and means for electrically coupling said delay means to said electrical means.

2. In phonograph apparatus for reproducing grooved records having a pickup device engaging said grooves, a system for detecting repeatedly reproduced signals recorded in a single groove comprising means electrically coupled to said pickup device for reproducing and comparing a pair of signals from consecutive grooves of said record, means to delay one of said signals, and means responsive to said compared signals for sensing a repeated groove condition.

3. The phonograph apparatus and system, according to claim 1, comprising in said first named means a medium upon which said signal output of said pickup device may be re-recorded.

4. In a phonograph apparatus wherein records having consecutive grooves are reproduced by a pickup device engaging said grooves, a system for counteracting repetitive engagement of the same one of said grooves comprising means electrically coupled to said pickup for providing two output signals, said means including means whereby said signals are separated in time by an interval equal to the period of one revolution of said record, and means responsive to said output signals operative to counteract repetitive engagement of any one of said grooves by said pickup device.

5. In phonograph apparatus for reproducing sound from grooved records including a pickup device for producing a signal output in response to signals recorded in the grooves tracking said grooves, a system for counteracting repetitive tracking of the same one of said grooves, said system comprising means electrically coupled to said pickup device and responsive to the signal output therefrom for delaying said signal output for a time interval equal to the period required for said pickup device to track one of said grooves, and means for comparing said delayed signal and said undelayed signal for identity providing a response indicative of a repeated groove when said delayed and undelayed signals are substantially identical for a given period, said signal output from said pickup device and said signal output from said delaying means being applied to said comparing means.

6. In phonograph apparatus for the reproduction of sound from grooved records having a pickup device for tracking said grooves, traversing said record, and transducing sound recorded therein into electrical signal; a system for eliminating the possibility of repetitively reproducing sound recorded in the same one of said grooves comprising an auxiliary record medium; means for recording said electrical signal on said record medium; means for producing one of a pair of signals corresponding to said electrical signal; means associated with said record medium for reproducing the other of said pair of signals separated in time from said one produced signal by an interval equal to the period required for said pickup device to track a single one of said grooves; and means responsive to said pair of electrical signals for sensing a repeated groove.

7. In phonograph apparatus for the reproduction of sound from grooved records having a pickup device for tracking said grooves, traversing said record, and transducing sound recorded therein into electrical signal; a system for eliminating the possibility of repetitively reproducing sound recorded in the same one of said grooves comprising an auxiliary record medium; means for recording said electrical signal on said record medium; means associated with said record medium for reproducing one of a pair of signals corresponding to said electrical signal from said record medium; means associated with said record medium for reproducing the other of said pair of signals separated in time from said one reproduced signal by an interval equal to the period required for said pickup device to track a single one of said grooves; and means responsive to said pair of electrical signals for sensing a repeated groove.

8. The phonograph apparatus and the system, according to claim 6 wherein said auxiliary recording medium in said system is a magnetic recording medium arranged in a loop, and wherein means are provided for rotating said loop at a constant velocity.

9. The phonograph apparatus and the system according to claim 8 wherein said means associated with said record medium in said system comprises a magnetic transducer electrically coupled to said pickup and magnetically coupled to said loop of magnetic recording medium for recording said electrical signal from said pickup on said record medium, and at least one other magnetic transducer spaced along said loop from said recording transducer and magnetically coupled to said loop for reproducing said signal recorded thereon.

10. In phonograph apparatus for the reproduction of sound from grooved records having a pickup device for tracking said grooves and traversing said record, said pickup providing an electrical signal corresponding to said recorded sound, a system for eliminating the possibility of repetitive tracking of the same groove in said record by said pickup comprising a loop of magnetic recording medium, means for rotating said loop at a constant velocity, a magnetic recording head coupled to said pickup for recording said electrical signal on said loop, a pair of magnetic reproducing heads positioned at points along said loop separated by a predetermined distance from each other whereby one of said reproducing heads provides an output signal delayed by an interval equal to the period of one revolution of said record from the output signal provided by the other of said reproducing heads, means for erasing said signal recorded on said loop after reproduction by said reproducing heads, and means responsive to said output signals provided by said reproducing devices for sensing a repeated groove condition.

11. In phonograph apparatus for the reproduction of sound from grooved records having a pickup device for tracking said grooves and traversing said record, said pickup providing an electrical signal corresponding to said recorded sound, a system for eliminating the possibility of repetitive tracking of the said groove in said record by said pickup comprising, a loop of magnetic recording medium, means for rotating said loop at a constant velocity, a magnetic recording head coupled to said pickup for recording said electrical signal on said loop, a magnetic reproducing head spaced in the direction of rotation of said loop from said recording head, said recording head and said reproducing head being sepaarted by a predetermined distance such that an output signal from said reproducing head is delayed from said recorded electrical signal by an interval equal to the period of one revolution of said record, means for erasing said signal recorded on said loop after reproduction by said reproducing head, and means responsive to said electrical signal from said pickup and said delayed output signal from said reproducing head to sense a repeated groove condition.

12. In phonograph apparatus for playing grooved records having a pickup device for engaging said grooves, a system for eliminating the possibility of said pickup repeatedly engaging the same groove of said record comprising, means responsive to the signal output of said pickup device for providing two signals separated by a time interval equal to the period of one revolution of said record, means for comparing said two signals, and analyzing means coupled to said comparing means, said analyzing means being responsive to a repeated groove condition when said two signals applied to said comparing means are identical for a given period.

13. In phonograph apparatus for playing grooved records having a pickup device for engaging said grooves, a system for eliminating the possibility of said pickup repeatedly engaging the same groove of said record comprising, means responsive to the signal output of said pickup device for providing two signals separated by a time interval equal to a period equal to one revolution of said record, means responsive to one of said two signals for providing an output signal corresponding to the envelope thereof, means responsive to the other of said two signals for providing an output signal corresponding to the envelope thereof, means for comparing said envelopes of said two signals, and analyzing means coupled to said last named means, said analyzing means being responsive to a repeated groove when said envelopes are identical for a given period.

14. The apparatus and the system defined in claim 13, wherein said system includes means electrically coupled to said analyzing means and cooperatively associated with said pickup for counteracting the repetitive engagement of any one of said grooves by said pickup.

15. In the system forming part of the phonograph apparatus as defined in claim 14, means for controlling the advance of said pickup across said record, said pickup advance control means being coupled to said analyzing means, and means responsive to the condition that no recorded signals exist in consecutive grooves of said record for inhibiting the operation of said pickup control means.

16. In phonograph apparatus for the reproduction of sound from grooved records having a pickup device for tracking said grooves and traversing said record, said pickup providing an electrical signal corresponding to said recorded sound, a system for eliminating the possibility of repetitive tracking of the same groove in said record by said pickup comprising, a loop of magnetic recording medium, means for rotating said loop at a constant velocity, a magnetic recording head coupled to said pickup for recording said electrical signal on said loop, a pair of magnetic reproducing heads positioned at spaced points along said loop, said points being separated by a predetermined distance whereby one of said reproducing heads provides an output signal delayed by an interval equal to the period of one revolution of said record from the output signal provided by the other of said reproducing heads, means for erasing said signal recorded on said loop after reproduction by said reproducing heads, an envelope detector coupled to one of said reproducing heads, another envelope detector coupled to the other one of said reproducing heads, a differential amplifier having dual inputs, said invelope detectors being individually coupled to a different one of said dual inputs, an analyzing circuit including a network having a discharge time equal to a substantial portion of said period of one revolution of said grooved record, means for applying the output signal from said differential amplifier to said analyzing circuit so as to operate said network therein, pickup control means for advancing said pickup across said record, said pickup control means being electrically coupled to said analyzing circuit, and means responsive to the output signal from said analyzing circuit and to the envelope of the output signal from one of said reproducing heads for inhibiting the operation of said pickup advance control means during consecutive silent grooves on said record.

17. In phonograph apparatus for the reproduction of sound from grooved records having a pickup device for tracking said grooves and traversing said record, said pickup providing an electrical signal corresponding to said recorded sound, a system for eliminating the possibility of repetitive tracking of any one groove on said record by said pickup comprising, a loop of magnetic recording medium, means for rotating said loop at a constant velocity, a magnetic recording head coupled to said pickup for recording said electrical signal on said loop, a magnetic reproducing head spaced in the direction of rotation of said loop from said recording head, said recording head and said reproducing head being separated by a predetermined distance such that an output signal from said reproducing head is delayed for an interval equal to the period of one revolution of said record, means for erasing said signal recorded on said loop after reproduction by said reproducing head, a network for equalizing the phase and amplitude response of said signal recorded on said loop with the output signal from said reproducing head, means for applying said signal from said pickup device to said equalizing network, an envelope detector coupled to the output of said equalizing network, another envelope detector coupled to said reproducing head, a differential amplifier having dual inputs, said envelope detectors being individually coupled to a different one of said dual inputs, an analyzing circuit including a network having a discharge time equal to a substantial portion of the period of one revolution of said grooved record, means for applying the output signal from said differential amplifier to said analyzing circuit so as to operate said network therein, pickup control means for advancing of said pickup across said record, said pickup control means being electrically coupled to said analyzing circuit, and means responsive to the output signal from said analyzing circuit and to the envelope of the signal recorded on said loop for inhibiting the operation of said pickup control means during consecutive silent grooves on said record.

18. In phonograph apparatus for reproducing sound from grooved records including a pickup device tracking said grooves, a system for counteracting repetitive tracking of the same one of said grooves, said system comprising means electrically coupled to said pickup device and responsive to the signal output therefrom for providing a first signal and a second signal both corresponding to said signal output from said pickup device, said means being operative to delay said second signal with respect to said first signal for a time interval equal to the period required for said pickup device to track one of said grooves, and means for comparing said first signal and said second signal for identity providing a response indicative of a repeated groove when said delayed and said undelayed signals are identical for a given period, said first signal and said second signal being applied to said comparing means.

References Cited in the file of this patent

UNITED STATES PATENTS

| | | |
|---|---|---|
| 2,336,777 | Clausen | Dec. 14, 1943 |
| 2,375,525 | Clausen | May 8, 1945 |
| 2,674,660 | Ambrose | Apr. 6, 1954 |
| 2,714,633 | Fine | Aug. 2, 1955 |
| 2,846,519 | Morrell | Aug. 5, 1958 |